3,573,947
ACCELERATOR FOR GYPSUM PLASTER
William Kinkade, Lisle, Ill., and Eugene Edward O'Neill, Okeene, Okla., assignors to United States Gypsum Company, Chicago, Ill.
No Drawing. Filed Aug. 19, 1968, Ser. No. 753,786
Int. Cl. C04b 13/22, 13/24
U.S. Cl. 106—315
15 Claims

ABSTRACT OF THE DISCLOSURE

A process for producing an accelerator for a calcium sulfate plaster comprising the steps of grinding together calcium sulfate dihydrate and sucrose at a temperature of up to about 145° F. until the surface area of the mixture is substantially increased, and heating the ground mixture under conditions which essentially preclude the formation of a dewpoint condition in the mixture to a final moisture content from about 6% to about 14% by weight.

BACKGROUND OF THE INVENTION

Filed of the invention

This invention relates to an accelerator for calcined gypsum plaster, and in particular it relates to an accelerator of enhanced activity and stability and to a method for its preparation. The product of this invention is especially useful as the accelerative ingredient in a set stabilized plaster.

When fresh calcium sulfate hemihydrate, plaster of Paris, is mixed with water for use without the addition of set-influencing additives, it sets in about 30 minutes and combines with some of the water to form calcium sulfate dihydrate. The setting time, however, changes with the age of the plaster, age first lengthening the setting time and then reducing it. Additional factors influence the setting time of formulated plasters mixed at the job site—the amount of sand added, the cleanliness of the mixing tools, and the temperature at the time of mixing. Although the market strongly prefers a predictable setting time, usually from about 2 to about 4 hours, this has been difficult to accomplish.

The prior art attempted to solve the problem of set stabilization in formulated plaster by the addition of relatively large (20-30 pounds per ton) and balanced quantities of accelerator and retarder, so that adventitious agents would have only minor effect on the formulated product.

An additional difficulty is encountered in providing an accelerator for formulated wall plasters because they are often bagged at a temperature of 250° F., and occasionally at 270° F., and the bags of hot plaster are piled in a warehouse or boxcar where cooling is slow, at least in the middle of the pile. Under these conditions the set control additives deteriorate so they do not perform reliably. Storage conditions also may adversely affect accelerators and retarders. Moreover, the market for plaster products has become more and more demanding of quality, and a degree of set stabilization which would have been considered adequate at one time is no longer acceptable.

Description of the prior art

Calcium sulfate dihydrate is among the materials taught by the prior art to be an accelerator which would perform acceptably in set stabilized formulations. King in U.S. Patent 2,078,198 disclosed that natural or raw gypsum, when ground until a substantial portion of it had a particle size smaller than 25 microns, was a highly desirable accelerator for this purpose. In the specification, formulae are shown which employ the finely ground gypsum in amounts from 8 to 40 pounds per ton of plaster and a claim recites the use of the minus 25 micron fraction of the dihydrate particles in the smaller amount of 2 to 3 pounds per ton.

In earlier work to develop an accelerator for plaster of Paris, Wiggin in U.S. Patent 1,460,396 disclosed a process in which the accelerator was formed by mixing powdered plaster of Paris with a quantity of water less than that necessary to solidify the whole mass and pulverizing the mass to a uniform size. Wiggin's accelerator contained about 1 ounce of water per pound of plaster by weight.

According to the prior art it was believed that the dihydrate accelerators shortened the setting time of the plaster by providing seed crystals. However, for production efficiency, the accelerator, along with other set stabilizing ingredients, was added to the plaster before the plaster was packaged and while the plaster was still hot, i.e. at about 250° F. At this elevated temperature, at least a portion of the dihydrate accelerator tended to become calcined and lost its accelerating effect.

An accelerator resistant to such a high temperature and comprising calcium sulfate dihydrate crystals in finely divided form intermixed with sugar in a ratio of 5 to 25 pounds of sugar per 100 pounds of dihydrate was disclosed by King in U.S. Patent 2,078,199. King further showed that plaster containing this sugar-dihydrate mixture as an accelerator, after being heated to 250° F. possessed improved set stability. As little as about one pound of acceelrator may be added per ton of plaster, but about 20 pounds per ton is preferred.

The smallest quantity of sugar mentioned by King was about 5 pounds per 100 pounds of dihydrate, but an earlier patent to Turner, U.S. Patent 2,007,315, disclosed that calcination of calcium sulfate dihydrate was delayed or inhibited by the addition thereto of from about 1% to about 3% by weight of sugar.

Dailey in U.S. Patent 3,017,305 disclosed sugars as calcination inhibitors. The American Potash and Chemical Corp. publication "Improving Gypsum Wallboard with Boric Acid" (1965) advocated the use of boric acid in a cast gypsum article as a calcination inhibitor.

In summary, the prior art recognized as accelerators for calcium sulfate hemihydrate plaster such materials as ground set gypsum, raw gypsum or land plastic ground until a substantial percentage of particles was smaller than 25 microns and dihydrate admixed with hemihydrate so that the combined water content of the mass was between 11% and 12% by weight. It was generally believed that calcination of these dihydrate-type accelerators reduced their accelerative ability and to prevent this reduction it was suggested that they be admixed with a calcination inhibitor, sugar for example, the amounts employed ranging from 1% to about 25% by weight of the dihydrate. Such a treated accelerator was effective after having been mixed with plaster and heated to 250° F.

The prior art did not appreciate, however, that aging adversely affected calcium sulfate dihydrate accelerators and that such accelerators have reduced potency after exposure to an environment of moderate temperature and high humidity. The prior art also failed to recognize that calcination of a calcium sulfate dihydrate accelerator need not always decrease its accelerative potency, and that if the calcination were performed under critically controlled conditions on a properly prepared precursor dihydrate, the calcination could enhance accelerative potency and impart to the accelerator high temperature stability (resistance to loss of potency at temperatures of 250° to 270° F.) and age stability (resistance to loss of potency at temperatures of 65° to 90° F. and 80% to 90% relative humidity).

There remains, therefore, a need for an improved accelerator which has a high degree of activity per unit of weight, is inexpensive to use, exhibits little change in accelerative characteristics when exposed to high temperature and high relative humidity for extended times and furnishes a great degree of set stability in the formulated plaster.

It is an object of this invention to provide a calcium sulfate accelerator which is extremely active, in that a small quantity produces a larger reduction in plaster set time. It is a further object to provide a calcium sulfate accelerator which possesses a previously unknown degree of temperature stability. It is a further object of this invention to provide an accelerator which has surprisingly good age stability. It is a still further object of this invention to provide an accelerator suitable for use in gypsum board manufacture, in bagged plaster and in Keene's cement. It is a still further object to provide a method for the preparation of the accelerator.

SUMMARY OF THE INVENTION

These and other objects are achieved through the discovery that not only can the accelerative activity of a calcium sulfate accelerator prepared from raw gypsum (land plaster) be enhanced by a finishing calcining step but that the partial calcination of the accelerator also imparts temperature and age stability to the product. The calcination may be performed in shallow trays or in fluid bed apparatus and may be continued for a time and at a temperature sufficient to reduce the dihydrate content of the accelerator to about 2% by weight, at which level the combined moisture determined by ASTM method C–471 may be about 0.5%, indicating the presence of a very high percentage of anhydrite. Greater activity results when the combined moisture of the product is between about 6% and about 14% and in a preferred embodiment the combined moisture value is from about 9% to about 12%. Excellent accelerator activity is obtained by calcination at 250° F., but the calcination temperature may be as low as 175° F. or even 150° F. Usually temperatures above 270° F. should be avoided because they make it difficult to control the moisture content of the accelerator.

The activity enhancement step is desirably performed on gypsum mixed with a calcination inhibiting agent such as sucrose. A mixture of sucrose and boric acid can also be used. The amount of calcination inhibiting agent may vary between 5% to about 25% by weight of the calcium sulfate dihydrate. When amounts smaller than 5% are used the actvity and stability of the finished accelerator is decreased accordingly. When the dihydrate is employed with relatively inert extender materials such as sand or anhydrite, the percentage of calcination inhibiting agent based on the weight of the dihydrate present may be much larger and may range upwards to about 150% of the weight of the dihydrate present. The mixing may conveniently be done in a ball mill and should be accompanied by grinding action sufficient to produce a relatively high surface area when determined with the Blaine air permeability apparatus—ASTM C–204; preferably the product after milling has a Blaine of more than 12,000 square centimeters per gram.

The mechanism by which this accelerator is formed and its mode of shortening the stuco setting time have not been determined, but it may be that grinding the land plaster (gypsum) increases the surface area of the calcium sulfate dihydrate and also produces a large number of dislocations or crystallization nucleating sites on the external surfaces of the particles, and further, probably forms cracks and induces strains in the underlying more interior portions of the dihydrate particles. The dislocations may be very small and since the disturbed portions of the dihydrate crystal mate perfectly with an adjacent and undisturbed portion, there is a very strong tendency for the dislocated fractions to realign themselves in their original position. Apparently this re-orientation is aided by an atmosphere of high humidity. Thus the highly active accelerator produced by grinding can "age" and lose activity unless the environment is closely controlled. It is possible that this loss of activity begins in the ball mill even while the grinding of other particles is in progress. A calcination inhibitor such as sugar, present during the grinding may be coated over the ground particles by the action of the balls. Perhaps it is selectively absorbed on the active sites.

The milling operation involves not only grinding to achieve size reduction but the action of the balls promotes an intimate association between the sugar and the land plaster which enhances the temperature stability of the accelerator after calcination. When the calcination inhibiting material is a sugar such as sucrose, it is believed that the moisture made available by particle calcination within the sealed mill is absorbed by the sugar to cause the sugar to flow at a lower temperature during the calcination step. This appears to increase the ability of the sugar to inhibit the loss of accelerative activity upon subsequent exposure of the milled accelerator to elevated temperatures.

Following the formation of active sites in the dihydrate crystal lattice and their coating with an inhibitor, the accelerator is post-heated under conditions which permit a certain amount of calcination to take place but without permitting the water of hydration which is liberated to accumulate and "age" those particles of accelerator yet uncalcined. This calcination step may further disrupt the crystals by propagating the cracks begun during the grinding process as indicated by an increase in surface area, but it is postulated that perhaps more importantly, the particles calcine selectively, the outer coating of inhibitor protecting the immediately underlying stratum of dihydrate according to the process of Turner, U.S. Patent 2,007,315 while permitting the inside of the particle to form the hemihydrate or anhydrite. This calcination of the particle interior disrupts the crystal structure underlying the protected dihydrate in the outer shell so that the basic dihydrate structure with which the disrupted dihydrate portions would ordinarily re-orient themselves are destroyed so that upon subsequent exposure to aging conditions the tendency of the active sites toward re-orientation within the crystal lattice is greatly diminished.

The product of this process has been suggested to be an accelerator particle having a largely hemihydrate or anhydrite core, surrounded by a thin surface of dihydrate with a surounding coating of sugar. Discontinuities in the crystal lattice of the dihydrate may operate as accelerative crystal-forming sites.

From the foregoing it is apparent that only a portion of the calcium sulfate initially charged to the grinding mill as the dihydrate remains as the dihydrate and is required as such in the completely processed accelerator. In all probability many potentially acceleratively active sites were not developed. Highly effective accelerators have been made from native anhydrite which contained about 12% dihydrate, from calcined gypsum which had a combined moisture content of from 6½% to 7% and therefore contained appreciable dihydrate and by charging to the grinding mill a mix containing 10% land plaster and 90% sand.

As pointed out above those skilled in the art have generally thought that calcium sulfate dihydrate was the accelerative agent and that a loss of water from this composition, as by calcination, would be accompanied by a loss in accelerative activity. To this end, calcination inhibiting compounds were employed to protect against loss of water of crystallization. Contrary to these views, it has been found that not only is it possible to have good accelerator activity when the accelerator contains a substantial amount, even a major portion, of hemihydrate, but that when the calcination of the accelerator is properly controlled its activity is thereby substantially enhanced. The calcination is performed with the ground mixture arranged in shallow beds, approximately one inch deep. Attempts to heat the mixture in deeper beds resulted in a great loss in accelerative activity.

It is considered that the loss of accelerative activity which occurs on heating in deep beds is the result of local dewpoint conditions and consequent formation of liquid water. Thus it is important in the process of the present invention to carry out the heating under conditions which essentially preclude the formation and development of local dewpoint conditions in the mass during heating. One method of achieving this objective is by the use of shallow beds in the heating of the ground mixture.

The ground mixture may also be heated in a fluid bed apparatus where the fluidizing media is warm dry air. Under these conditions the depth of the bed is of no consequence but the condition under which the heating is carried out should be such as to essentially preclude the formation of local dewpoint conditions and consequent formation of liquid water.

A minimum calcination temperature is about 150° F., since at this temperature, an excessively long time (more than 90 hours) is required to produce appreciable water loss. The time becomes progressively shorter as the temperature is raised and good results are achieved in a reasonable time at a temperature of 200° F. to 250° F. It does appear, however, that a complete loss of water greatly reduces accelerator potency. This may occur very rapidly at a temperature above about 270° F. and therefore, higher temperatures are to be avoided.

The water loss during the heating step is accompanied by an increase in Blaine surface area of the accelerator, a fact which undoubtedly contributes to its enhanced activity. It may also be that the calcination of the accelerator particles renders them dispersible so that upon being wetted with water, they fragment, thus making the un-calcined dihydrate portions more widely available in the slurry.

Superior response to the heat treatment resulted when the calcium sulfate dihydrate had been ground to produce a large increase in Blaine surface area and in the presence of a calcination inhibiting agent. Such agents are well known and include sugars such as dextrose, sucrose and the like. When using a sealed mill for the grinding and coating step, the mill and the mill charge is pre-heated to temperatures of from about normal ambient room temperatures (75° F.) or above up to about 145° F. and preferably at a temperature of about 115° F. to 125° F. During the grinding operation, with a sealed mill, there is a temperature rise which produces some calcination with a resultant increase in the relative humidity.

It is believed that sites active for nucleating crystallization are produced in the grinding in direct proportion to the increase in Blane surface area. During grinding, the dihydrate coats the grinding balls and limits the area developed by grinding. This may be about 12,000 cm.$^2$/gm. but depends on the mill used. Consequently, to develop a large increase in Blaine surface area by grinding, it is desirable to start with a land plaster having a rather low surface area, about 2,500 cm.$^2$/gm. (90–95% through 100 mesh) and grind to a Blaine surface area of about 12,000 cm.$^2$/gm. Calcium sulfate dihydrates of 6,000 or so cm.$^2$/gm. can be used in the starting material but the final accelerator will then not be quite as active.

The process of this invention will be illustrative by the following examples but it is to be understood that the examples are illustrative only and are not intended to be limiting.

EXAMPLE 1

A ball mill was preheated to 115° F. to 125° F. and charged with 66.5 pounds of land plaster with a Blaine surface area of 2,400 square centimeters per gram (100% through 30 mesh), 3.5 pounds sucrose (5% by weight of the gypsum-sugar mix) and 550 pounds of 13/16" x 13/16" Burundum balls. The mill was closed and the charge milled for 1½ hours, at which time its temperature was about 145° F. The product when removed had a Blaine surface area of 12,000 square centimeters per gram.

This milled land plaster-sugar mixture was transferred to a circulating air oven where it was placed in shallow trays to a depth of about ¾ inch and calcined at 250° F. for 23 hours. The product had a combined moisture content of 12%.

During the calcination step the white milled plaster developed a light tan color and an odor of caramel. When viewed under the microscope the particles appeared to have a uniform and continuous tan colored exterior. The tan color resulting from the caramelization may be used as an indicia of completion of the heating or baking step as will be hereinafter more fully described.

Portions of the baked accelerator were each added to 200 grams of fresh molding plaster in the amounts shown in Table 1, the accelerated plaster mixed with 180 ml. of water for seven seconds in a Waring Blendor and its vicat and temperature rise set determined as reported in Table 1.

Separate portions of the baked accelerator were exposed for forty (40) hours in a cabinet maintained at 80° F. and 80% relative humidity. After exposure the accelerative potency was determined as above with the results reported in Table 1.

EXAMPLE 2

The procedure of Example 1 was repeated except that the charge to the mill comprised 63 pounds of land plaster and 7 pounds of sucrose (10% by weight of the gypsum-sugar mix). After milling for 1½ hours, the gypsum-sugar mix had a surface area of 11,100 square cm./g. The accelerative potency of samples withdrawn from this material was determined as milled and after exposure in the 80° F. 80% RH cabinet. The main body of the milled mix in each was heated at 250° F. for 24 hours in shallow trays and its accelerative potency determined in the freshly baked condition and after exposure in the humidity cabinet. The results of Example 2 are shown in Table 1.

TABLE 1.—LAND PLASTER WITH SUGAR AS CALCINATION INHIBITOR

| Composition | Treatment | Grams added | | | | | |
| | | .05 | | 0.10 | | 0.20 | |
| | | Vicat [1] | Tr [1] | Vicat | Tr | Vicat | Tr |
|---|---|---|---|---|---|---|---|
| 95% land plaster 5% sucrose | Example 1 | 6:20 | 17:05 | 5:20 | 15:30 | 4:30 | 14:05 |
| | Example 1 plus 40 hours at 80° F. and 80% RH. | 8:50 | 20:50 | 7:15 | 18:45 | 6:10 | 17:00 |
| 90% land plaster 10% sucrose | Example 2 milled | 6:45 | 18:05 | 5:35 | 16:10 | 4:30 | 14:35 |
| | Milled-humidified | 10:30 | 22:40 | 8:40 | 20:55 | 6:50 | 18:15 |
| | Milled-baked | 6:10 | 16:25 | 5:00 | 14:35 | 4:10 | 13:35 |
| | Milled-baked-humidified | 7:00 | 18:20 | 5:45 | 16:20 | 4:45 | 14:15 |

[1] Vicat and temperature rise (Tr) set times given in "minutes:seconds."

The accelerative potency must be measured at various levels of concentration because the relationship of setting time reduction per unit of accelerator addition is not a straight line function. In making the setting time determinations reported in Table 1, the indicated quantity of accelerator, prepared according to Example 1, was added to 200 grams of aged molding plaster and 180 ml. of water, and mixed for seven seconds in a Waring Blendor. Initial slurry temperature was 81° F. It is clear from the results shown in Table 2, that at a low concentration of accelerator, a relatively small increase produces a much greater decrease in setting time than that resulting from an increase of a similar size after the concentration has passed 0.1%. A further increase of accelerator concentration to about 1% produced only a minor further reduction in setting time.

TABLE 2.—EFFECT OF ACCELERATOR CONCENTRATION ON SETTING TIME

| Accelerator added, grams | Vicat, minutes: seconds | Setting time temperature rise, minutes: seconds |
|---|---|---|
| 0.005 | 11:30 | 24:10 |
| 0.01 | 9:15 | 21:30 |
| 0.02 | 7:15 | 19:00 |
| 0.03 | 6:30 | 18:20 |
| 0.04 | 5:55 | 17:45 |
| 0.05 | 5:40 | 17:00 |
| 0.125 | 4:20 | 14:50 |
| 0.25 | 3:30 | 13:20 |
| 0.375 | 3:10 | 12:50 |
| 0.5 | 2:45 | 12:00 |
| 1.0 | 2:20 | 10:30 |

Accelerator made according to Example 1 was successfully used in wall board manufacture and also in formulating set stabilized wall plasters.

It was one of few materials found capable of shortening the setting time of Keene's cement. The increase in accelerator activity which resulted with a higher proportion of sugar to stucco in the mill charge is illustrated by the following example.

EXAMPLE 3

The method of Example 1 was repeated except that the gypsum-sugar mix in the charge comprised 25% by weight sucrose. The comparative accelerative activity of the products of Example 1 and 3 was determined by adding equivalent quantities of each accelerator to 200 grams of molding stucco and determining the setting time. The comparative data are shown in Table 3.

TABLE 3.—COMPARATIVE ACCELERATOR ACTIVITY

| Accelerator | Grams added to 200 grams molding stucco | Vicat set minutes: seconds | Temperature rise set minutes: seconds |
|---|---|---|---|
| Example 1, 5% sugar | 0.05 | 6:20 | 17:05 |
|  | 0.10 | 5:20 | 15:30 |
|  | 0.20 | 4:30 | 14:05 |
| Example 3, 25% sugar | 0.05 | 6:00 | 16:35 |
|  | 0.10 | 5:10 | 15:35 |
|  | 0.20 | 4:05 | 13:40 |
| Control | 0.0 | 32:30 | 45:05 |

It will be noted that in each instance the accelerator containing 25% sugar produced a shorter vicat set and with a single exception a shorter temperature rise set.

The improved stability of a plaster formulated with the accelerator of Example 1 when exposed to a variation in mixing temperatures is illustrated by the following example.

EXAMPLE 4

For this comparison the dry ingredients were combined in the proportions shown in Table 4 and each formula separated into two portions. One portion was mixed with 2½ parts of plaster grade sand per parts of the previously combined ingredients and its set was determined at room temperature (75° F.) and reported in hours and minutes. The other portion of each formula was cooled to 40° F. along with the sand, water and mixing bowls. The materials were moved from the conditioning cabinet long enough to be mixed and then returned to the cabinet until set. All sets were determined by the temperature rise method. It will be noted that in each instance the change in set with a change in mixing temperature from 75° F. to 40° F. was less when using the accelerator of Example 1 than when using the lime-alum accelerator formula of the prior art.

The clean set is determined with clean tools and mixing utensils; for the job set sufficient set gypsum is added to simulate the set resulting under job conditions using poorly cleaned equipment.

TABLE 4.—EFFECT OF MIXING TEMPERATURE ON SETTING TIME OF FORMULATED PLASTERS

| Sample No | 1 | 2 | 3 | 4 | 5 | 6 |
|---|---|---|---|---|---|---|
| Aridized machine plaster stucco grams | 2,000 | 2,000 | 2,000 | 2,000 | 2,000 | 2,000 |
| Accelerator of Example 1, grams | 0.25 | 0.25 | 0.25 |  |  |  |
| Lime, grams |  |  |  | 5 | 5 | 5 |
| Alum, grams |  |  |  | 3 | 3 | 3 |
| Kertinaceous retarder,[1] grams | 4.0 | 4.5 | 5.0 | 4.0 | 4.5 | 5.0 |
|  | Hour:minutes |  |  |  |  |  |
| Job set 75° F | 2:40 | 3:05 | 3:30 | 3:30 | 4:05 | 4:30 |
| Job set 40° F | 2:55 | 3:30 | 4:25 | 4:10 | 4:55 | 5:40 |
| Change | :15 | :25 | :55 | :40 | :50 | 1:10 |
| Clean set 75° F | 4:15 | 6:10 | 8:15 | 10:35 | 13:20 | 22:55 |
| Clean set 40° F | 3:50 | 4:25 | 5:15 | 7:10 | 9:55 | 13:05 |
| Change | :25 | 1:45 | 2:30 | 3:25 | 3:25 | 9:50 |

[1] Degraded protein.

The following examples will illustrate the preparation of the accelerator of this invention using variations in the proportions of the starting materials.

EXAMPLE 5

A mix of 95% anhydrite rock having a combined moisture content of 2.4% (equivalent to a gypsum content of 12%) and 5% powdered sugar was ground using 8 pounds of balls per pound of mix for 25 hours.

The accelerative activity was determined upon removal from the mill and also after heating for 24 hours at 250° F.

A mix of 5% land plaster, 5% powdered sugar and 90% sand was ground using 8 pounds of balls per pound of mix for 12 hours to give a product with a Blaine surface area of 4,300 square centimeters per gram. The accelerative activity was again determined as made and after exposure at a temperature of 250° F. for 24 hours.

A mix comprising 2½% land plaster, 3.5% sucrose and the balance sand was added to a mill containing 8 pounds of grinding balls per pound of mix and ground for 10 hours until a Blaine surface area of 3,800 square centimeters per gram was achieved. This accelerative potency was determined at the end of the milling and after 24 hours of exposure to a 250° F. temperature. Results are shown in Table 5.

TABLE 5.—ACTIVITY OF ACCELERATORS

| Accelerator composition | Griding time hours | Blaine surface area, cm.²/ grams | Vicat set as made, minutes: seconds | Heated 24 hours | |
|---|---|---|---|---|---|
| | | | | Weight loss, percent | Vicat set: minutes, seconds |
| Control stucco, no accelerator | | | 24:00 | | |
| Anhydrite: | | | | | |
| 2.4% comb water, 2.5% powered sugar | 25 | 7,300 | 3:05 | 1.85 | 2:55 |
| 5% land plaster, 5% powered sugar, 90% sand | 12 | 4,300 | 2:45 | 0.99 | 2:35 |
| 2.5% land plaster, 3.5% sugar, 94% sand | 10 | 3,800 | 3:35 | | 3:20 |

The setting time was determined by mixing 0.25% accelerator into number 1 molding plaster, adding the material to 60 grams of water per 100 grams of plaster, soaking for 30 seconds and mixing for 30 seconds and recording the time at which the slurry reached maximum temperature. Note that each accelerator greatly reduced the setting time of the stucco and further, that after heating to 250° F. to produce a water loss, the accelerative activity was enhanced.

That the milling of the land plaster and the calcination inhibiting material accomplishes more than the mere size reduction of the land plaster, is illustrated in the following example.

EXAMPLE 6

A ball mill was loaded with 200 pounds of land plaster and 10 pounds of granulated sucrose at a temperature of 89° F. and mill operation begun. At 15 minute intervals the mill was stopped, a sample obtained and its Blaine surface area was determined. In testing each sample for accelerative potency, one half gram of the accelerator was added to 100 grams of molding plaster in 65 ml. of water, soaked 1 minute and mixed one half minute by hand. A portion of each sample was set aside in an oven at 222° F. for 2 days and its accelerative potency determined as above after the heat treatment. The results are shown in Table 6.

TABLE 6.—EFFECT OF MILLING TIME ON TEMPERATURE STABILITY

| Time | Mill temperature, °F. | Surface area cm.²/gram | Vicat set | |
|---|---|---|---|---|
| | | | Fresh minutes: seconds | After 48 hours at 222° F. minutes: seconds |
| Minutes: | | | | |
| 0 | 89 | 5,000 | 7:30 | 24 |
| 15 | 89 | 7,500 | 4:00 | 12 |
| 30 | 89 | 8,700 | 4:00 | 10:30 |
| 45 | 89 | 10,200 | 3:50 | 9:45 |
| 60 | 100 | 10,500 | 3:40 | 9:30 |
| 75 | 100 | 11,100 | 3:55 | 9:00 |
| 90 | 100 | 11,400 | 3:40 | 7:30 |
| 105 | 100 | 11,200 | 4:00 | 6:00 |
| 120 | 125 | 11,200 | 3:35 | 5:45 |

It can be noted that as the milling proceeded, the temperature of the contents rose from 89° F. to 125° F. During the first 45 minutes of the milling operation the surface area increased from 5,000 to 10,250 square centimeters per gram and the setting time of the stucco was reduced from 7.5 minutes to 3 minutes 50 seconds. Further milling for an additional 75 minutes produced very little increase in the surface area of the accelerator or in its accelerative ability. It will be noted however, that the added milling apparently increased the intimacy of contact between the land plaster and the sugar so that the accelerative potency after heating at 222° F. was much improved by the added milling.

As was demonstrated in Example 6 above, the accelerative potency of land plaster increased directly with an increase in surface area during the milling operation. However, the activity so developed can be lost by exposure to a humid atmosphere, some of which may occur even in the mill so that the activity generated during the first part of the milling step may be lost during the latter part of that operation. Likewise, it is desirable that the milled dihydrate-calcination inhibitor mixture be protected from high humidity at all times prior to the calcination treatment and that the moisture driven from the calcining particles not be allowed to accumulate on those adjacent thereto as this moisture will "age" these particles with a resultant loss of accelerative activity.

EXAMPLE 7

The procedure of Example 1 was repeated except that the charge to the mill comprised 85% land plaster, 10% sucrose and 5% boric acid. At the termination of the milling operation the mixture had a Blaine surface area of 8,300 square centimeters per gram.

A portion of the milled material was humidified at 80° F. and 80% relative humidity for 20 hours. Another portion was placed in a shallow tray and baked at 250° F. for 24 hours; a portion of this baked material was further heated for 18 hours at 270° F. Samples of each of these accelerators were withdrawn and mixed with 200 grams of molding plaster in the quantities indicated and the vicat and temperature rise sets determined with results as shown in Table 7.

It will be noted that the accelerator containing the mixture of sucrose and boric acid, when exposed to a highly humid atmosphere prior to a baking or calcination step, lost activity as did the accelerator employing sucrose alone as the inhibiting agent. It should be especially noted however that even after exposure at 270° F. for 18 hours, only 0.05 gram of accelerator added to 200 grams of molding plaster produced a vicat set of 8 minutes 15 seconds whereas the unaccelerated molding plaster had a set of 42 minutes.

When the method was repeated charging 89% land plaster, 10% sucrose and 1% boric acid to the mill, an accelerator of comparable activity and stability was obtained. This example illustrates the extreme degree of temperature stability which can be achieved by the process of this invention.

TABLE 7.—LAND PLASTER WITH SUCROSE PLUS BORIC ACID AS CALCINATION INHIBITOR

| Composition | Treatment | Grams accelerator added | | | | | |
|---|---|---|---|---|---|---|---|
| | | 0.05 | | 0.10 | | 0.20 | |
| | | Minutes:seconds | | | | | |
| | | Vicat | TR | Vicat | TR | Vicat | TR |
| 85% land plaster, 10% sucrose, 5% boric acid. | Milled | 7:55 | 19:10 | 6:25 | 17:40 | 5:40 | 15:10 |
| | Milled-aged | 10:15 | 23:10 | 8:15 | 20:15 | 6:30 | 17:30 |
| | Milled-baked-250° F | 8:15 | 20:00 | 6:35 | 17:55 | 5:40 | 16:00 |
| | Milled-baked-250° F., heated 270° F. 18 hours. | 8:15 | 19:45 | 6:25 | 17:50 | 5:20 | 16:15 |
| 89% land plaster, 10% sucrose, 1% boric acid. | Milled-baked-250° F., heated 270° F. 18 hours. | 8:30 | 19:45 | 7:00 | 18:10 | 6:10 | 16:05 |

It has been noted that caramelization of the sucrose gypsum mixture occurs during heating to the required degree. Accordingly, the extent of the caramelization and thus the desired extent of heating may conveniently be measured by the following procedure.

The following Table 8 will illustrate the use of varying amounts of sucrose in the preparation of accelerators according to the present invention. Also included are the results obtained by the use of the equivalent alternatives of fructose, lactose and dextrose.

TABLE 8.—STANDARD WARING 7 SECONDS TEST

|  | Blaine surface area | Milled only | | Milled, baked, 250° F. | | Milled, baked, humidified 80-80 | | Percent combined water, milled and baked |
| --- | --- | --- | --- | --- | --- | --- | --- | --- |
|  |  | Minutes:seconds | | | | | | |
|  |  | Vicat set | Final set | Vicat set | Final set | Vicat set | Final set |  |
| 1% sucrose | 14,220 | 7:20 | 18:50 | 15:10 | 27:50 | 18:00 | 30:45 | 6 |
| 3% sucrose | 13,160 | 6:15 | 16:50 | 5:30 | 15:50 | 8:30 | 20:00 | 9 |
| 5% sucrose | 14,460 | 6:00 | 16:30 | 5:15 | 15:05 | 8:00 | 19:50 | 12 |
| 7% sucrose | 13,850 | 5:50 | 16:00 | 5:05 | 15:00 | 7:15 | 18:40 | 13 |
| 10% sucrose | 15,950 | 5:40 | 15:55 | 4:50 | 14:15 | 6:45 | 17:50 | 15 |
| 5% lactose | 12,870 | 6:10 | 16:50 | 6:15 | 16:45 | 8:30 | 19:40 | 10.5 |
| 5% dextrose | 10,900 | 8:00 | 19:45 | 7:25 | 19:30 | 9:45 | 21:45 | 8.5 |
| 5% fructose | 10,740 | 5:40 | 15:50 | 5:30 | 15:35 | 10:50 | 22:10 | 14 |
| 2½% dextrose, 2½% fructose | 11,500 | 6:30 | 18:15 | 6:15 | 16:50 | 11:20 | 23:10 | 13.2 |

Test method 500 ccs. of methanol was poured into a Waring Blendor and the blender was turned on to low speed. Fifty grams of the gypsum accelerator sample prepared in accordance with this invention was slowly introduced into the blender. After completing the addition of the sample, 250 ccs. of water was poured into the mixer and allowed to run for 30 seconds. The sample was then quickly poured into a small Büchner funnel with 25 inches of vacuum and filtered through an S&S #576 filter paper. A further 250 ccs. of water was then used to rinse the remaining sample. The 500 ccs. filtrate from each of the samples was then evaporated in a 110° oven to concentrate the extract. Upon completion of the evaporation each of the samples was brought back up to 275 ccs. and a reading taken on the Gardner-Hellige varnish comparator. It is to be noted that the hue of the sample color did not match those on the color disc No. 620C-40 and the readings are based on the color concentration of the extracts. Very little color, if any, was left in the filter residue.

Water methanol filtrate comparisons (Gardner-Hellige varnish comparator—1933 Gardner color scale—disc No. 620C-40).

Three samples of the products of this invention gave the following results:

Product:                                              Gardner color
A                                                     6
B                                                     7
C                                                     6

Broadly a Gardner color of at least 4 is satisfactory and a color of from 5 to 8 is preferred.

The products of the present invention may be prepared using a fluidized bed apparatus for the heating step in lieu of heating in a shallow bed. The following example will illustrate this general procedure.

EXAMPLE 8

A fluid bed six inches in diameter and 5 feet high having heat conductive side walls and a steam jacket surrounding the side walls was used in this procedure. A ground gypsum charge produced by ball milling a mixture of 95% gypsum and 5% sucrose was introduced into the bed at room temperature. Steam was then introduced into the jacket and thermostatically set for 250° F. Electrically heated air (250° F.) was introduced at the bottom of the bed at a rate of about 4 c.f.m. (2–3 p.s.i.). The bulk density of the charge in the fluidized state was about 35 pounds per cubic foot. The bed was operated for 15 hours and the product removed. The accelerator product in standard Waring tests produced a Vicat set of 6 min. 15 sec. and a final set of 15 min. 50 sec.

From the foregoing description of the invention and the examples, it is clear that there has been developed a novel process for the preparation of an accelerator for gypsum plastic and a novel gypsum plaster accelerator product. The process enhances the accelerative activity of the product and provides unexpectedly great resistance to deterioration of the accelerator from exposure to high temperature and high humidity conditions.

We claim:
1. A process for producing an accelerator for a calcium sulfate plaster comprising the steps of grinding together a charge of calcium sulfate dihydrate and sucrose at a temperature up to about 145° F. until the surface area of the mixture is substantially increased, removing the mixture from the grinder, and heating the ground mixture under conditions which essentially preclude the formation of a dew point condition in the mixture to a final combined moisture content of from about 6 to about 14% by weight.

2. A process for the preparation of a setting accelerator for calcined gypsum plaster which comprises the steps of ball milling powdered gypsum and about 5–15% sucrose based on the weight of said gypsum until the Blaine surface area thereof reaches a value of about 12,000 sq. cm./gm. and thereafter heating the same under conditions which substantially prevent the occurrence of a dew point in the same for a time and at a temperature sufficient to effect caramelization of said sucrose.

3. The process of claim 2 wherein the extent of caramelization is sufficient that the Gardner color of a methanol-water extract of the heated product is at least 4, when determined by the herein described procedure.

4. A process according to claim 3 wherein the extract has a Gardner color of from 6 to 8.

5. A process according to claim 1 wherein the combined moisture in the heated product is from about 9 to about 12% by weight.

6. A process according to claim 1 wherein the temperature at which the ground mixture is heated is between about 200° F. to 270° F.

7. A process according to claim 1 wherein the heating of the ground mixture is carried out in a shallow bed.

8. A process according to claim 1 wherein the heating of the ground mixture is carried out in a fluidized bed.

9. A process for producing an accelerator for a calcium sulfate plaster comprising the steps of grinding together calcium sulfate dihydrate and from about 5% to about 150% by weight based on said dihydrate of sucrose at a temperature of from about room temperature up to about 145° F., continuing the grinding until the surface area of the mixture is about 12,000 square centimeters per gram, and heating the ground mixture in a shallow bed until the ground product has a combined moisture content of from about 6% to about 14% by weight.

10. A process for producing an accelerator for calcium sulfate plaster comprising grinding low surface area landplaster and sucrose until a surface area of about 12,000 square centimeters per gram is achieved, and heating the ground material in a shallow bed for more than about 1 hour at a temperature above about 200° F. until a further increase in surface area is achieved and the combined moisture of the product is from about 6% to about 14% by weight.

11. The process of claim 1 wherein the charge also includes boric acid.

12. Process of preparing a setting accelerator for gypsum plaster which comprises the steps of charging a ball mill with grinding media and with landplaster of about 2500 sq. cm./gm. surface area and with at least about 1% of sucrose based on the weight of said landplaster, the loose volume of said landplaster and sucrose not substantially exceeding the void volume of said grinding media, rotating said mill for a period of time sufficient to increase the surface area of said landplaster to about 12,000 sq. cm./gm., all at a temperature not in excess of about 145° F. removing the ground landplaster and sucrose from said mill and heating the ground mixture in an ambient atmosphere whose temperature is about 250° F. for about 24 hrs. under conditions in which no portion of the ground mixture is below the dew point of its immediately surrounding atmosphere, and removing the thus heated mixture from the heating zone for use as such accelerator.

13. A setting accelerator for calcined gypsum plaster which comprises an admixture of about 5–15% caramelized sucrose and partially calcined landplaster, the said accelerator being characterized by a combined water content in the range of from about 6 to about 14%.

14. The accelerator claimed in claim 13 wherein the combined water content is within the range of from about 9 to about 12%.

15. The accelerator claimed in claim 13 wherein the admixture includes about 5% boric acid.

References Cited

UNITED STATES PATENTS

| | | | |
|---|---|---|---|
| 2,078,199 | 4/1937 | King | 106—315 |
| 2,487,030 | 11/1949 | Schustek | 106—114 |

JAMES E. POER, Primary Examiner

U.S. Cl. X.R.

106—114